United States Patent [19]

Looschen

[11] Patent Number: 4,673,811

[45] Date of Patent: Jun. 16, 1987

[54] VARIABLE THRESHOLD SCAN DETECTOR UTILIZING CROSSOVER POINTS ON PHOTODETECTORS OF THE LASER BEAM TO MONITOR THE THRESHOLD

[75] Inventor: Floyd W. Looschen, Laguna Beach, Calif.

[73] Assignee: Xerox Corporation, Stamford, Conn.

[21] Appl. No.: 804,965

[22] Filed: Dec. 5, 1985

[51] Int. Cl.$^4$ ............................................. H04N 1/10
[52] U.S. Cl. ................................... 250/235; 358/293
[58] Field of Search ............... 250/208, 209, 214, 235, 250/236, 561; 358/293, 294

[56] References Cited

U.S. PATENT DOCUMENTS

| | | | |
|---|---|---|---|
| 3,898,583 | 8/1975 | Shuey | 331/94.5 |
| 4,092,632 | 5/1978 | Agulnek | 358/294 |
| 4,181,901 | 1/1980 | Heyke | 331/94.5 |
| 4,238,707 | 12/1980 | Malissin et al. | 315/175 |
| 4,329,656 | 5/1982 | Chen | 372/29 |
| 4,345,330 | 8/1982 | Howie et al. | 372/29 |
| 4,412,331 | 10/1983 | Chapman | 372/29 |

FOREIGN PATENT DOCUMENTS 2030816A 4/1980 United Kingdom .

OTHER PUBLICATIONS

IBM Tech. Discl. Bull.; "Multi-Function Auto Thresholding Algorithm"; Wong; vol. 21, No. 7; Dec. 1978; pp. 3001-3003.
IBM Tech. Discl. Bull.; "Dynamic Video Thresholding"; H. Kleep; vol. 22, No. 3; Aug. 1979; pp. 1031-1033.
Xerox Discl. Journal; "Adaptive Binariser"; Tandon et al., vol. 6, No. 5; Sep./Oct. 1981; pp. 283-286.

Primary Examiner—David C. Nelms
Assistant Examiner—S. Allen
Attorney, Agent, or Firm—Franklyn C. Weiss

[57] ABSTRACT

A variable threshold scan detector for use in raster output scan (ROS) systems, whereby the input scanning beam intensity is continually monitored and the threshold is set at a percentage of the signal value. Feedback from a peak detector circuit adjusts the threshold voltage to approximately 55 percent of the peak voltage. When the signal voltage exceeds the threshold voltage, the crossover circuit is enabled and a scan pulse is generated when crossover is detected. The scan detector ignores noise signals below the threshold voltage.

3 Claims, 4 Drawing Figures

4,673,811

VARIABLE THRESHOLD SCAN DETECTOR UTILIZING CROSSOVER POINTS ON PHOTODETECTORS OF THE LASER BEAM TO MONITOR THE THRESHOLD

This invention relates to a variable threshold scan detector for use in raster output scan (ROS) systems, whereby the input scanning beam intensity is continuously monitored and the threshold is set at a percentage of the signal value.

BACKGROUND OF THE INVENTION

Scan detector outputs are used to synchronize video data and control the video transfer rate in raster output scan (ROS) systems. The video data rate is adjusted for each scan line based on the time between scan detector outputs of the previous scan line. Raster output scan (ROS) printer quality is directly affected by scan detector malfunction. The scan detector input is a laser scanning beam and a pulse is produced as the beam passes over the center of a photodiode. That is, the scan detectors in a raster output scan printer develop pulses used to synchronize and control the transfer rate of each line of video data. A laser scan beam passes over a photodiode and causes a scan detector output pulse. The pulse circuit is enabled when the photodiode signal exceeds a threshold value. This threshold is set above the maximum expected noise level and below the minimum expected signal level. Normal expected signal levels increase when the printer photoreceptor ages and the laser intensity is adjusted to compensate. Prior art practice provides low safety margins on the scan detector function and can be the first circuit to fail in an operating output printer.

The present invention concerns a technique of improving scan detector margins by an order of magnitude so that the scan detector threshold margins are improved to a point where the scan detector function is the last function to fail as the ROS system degrades.

Previous techniques have utilized a detector threshold value which is a compromise setting between the largest expected noise with the brightest laser and the smallest expected signal with the dimmest laser. The present technique continuously monitors beam intensity/signal and maintains the threshold at a selected percent of the signal value. The disclosed scan detector includes a peak detector function and the output of this function provides the input to a variable threshold circuit.

According to the present invention, feedback from a peak detector circuit adjusts the threshold voltage to approximately the selected percent of the peak voltage. When the signal voltage exceeds the threshold voltage, the crossover circuit is enabled and a scan pulse is generated when crossover is detected. The scan detector ignores noise signals below the threshold voltage.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
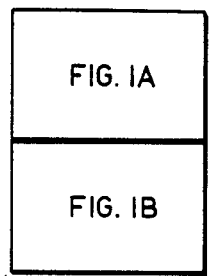
FIGS. 1, 1A and 1B are schematic diagrams of the circuit in accordance with the principles of the present invention.
Figure 2:
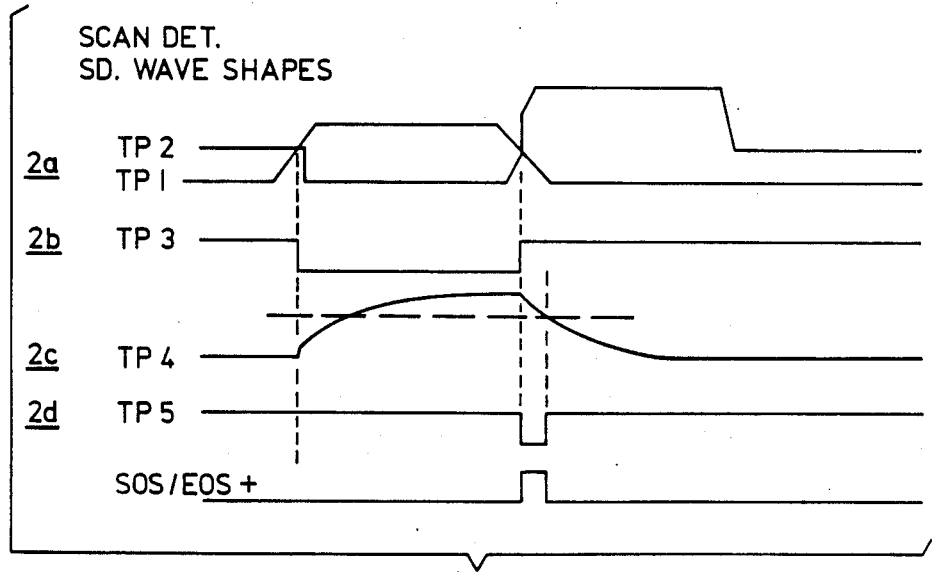
FIGS. 2a, 2b, 2c, 2d and 2e include wave shapes important in understanding the operation of the invention set forth in FIG. 1.
Figure 1A:
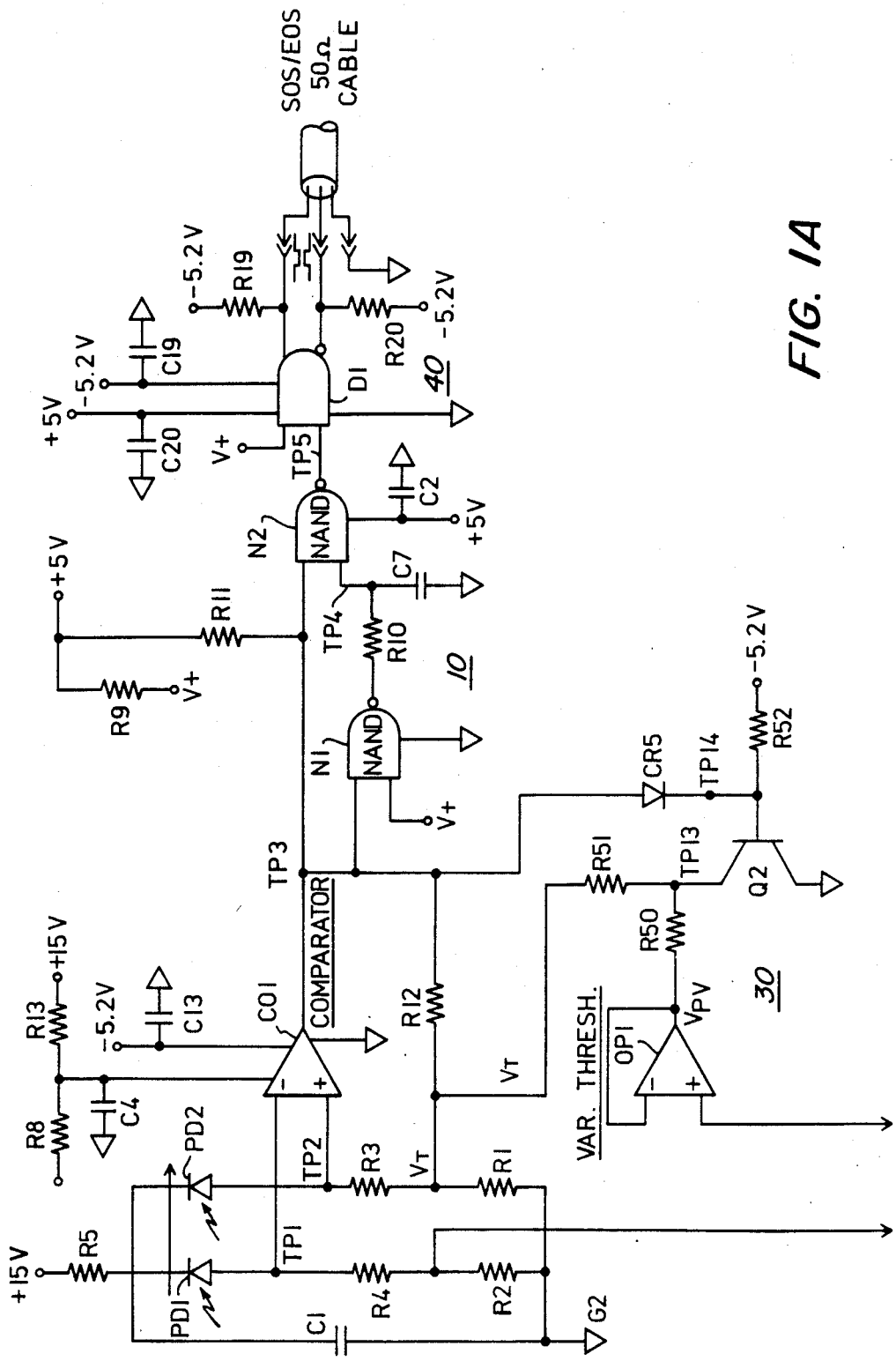
Figure 1B:
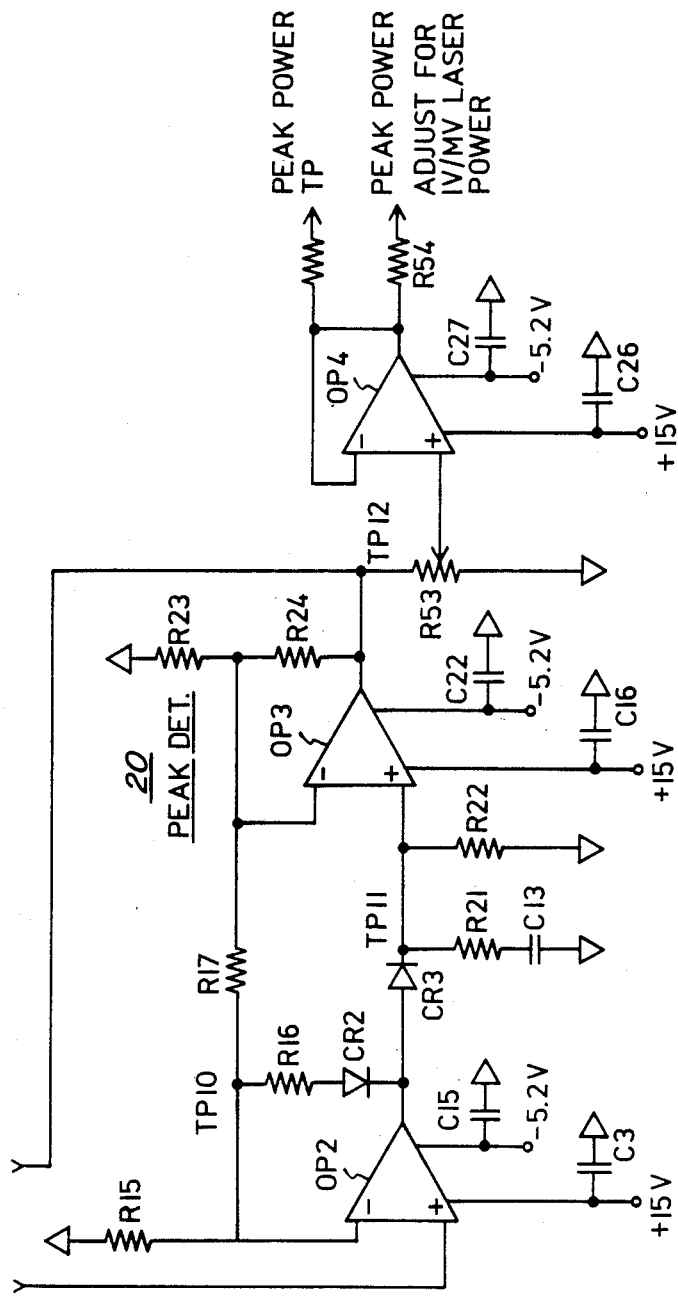

The present invention comprises a circuit to accomplish the aims of the invention namely to monitor beam intensity and maintain the threshold thereof at a particular percent of the input signal value so as to present a clear signal to the print circuit for accurate placement of the light beam on the photoconductor or other photosensitive surface for accurate resolution of the output document. In the upper left hand corner of FIG. 1, is seen the two photodiodes PD1, PD2 and accompanying comparator circuit C1. These two photodiodes are shown apart schematically but actually comprise one unit and abut each other in a singular circuit component. The scan beam would be moving from left to right in the direction of the arrow and first would impinge photodiode PD1 and then photodiode PD2 in that order. When the light beam from the laser starts to impinge on the photodiode, the photodiode begins to conduct slowly until the full beam is impinging on the photodiode. The photodiode PD1 begins to conduct in a manner seen in FIG. 2a for the curve labeled TP1. It can be seen that TP1 is a two-level signal with a slight ramp at the beginning and end. The signal ramps up as the beam moves onto the photodiode, and remains high until it ramps down as the beam moves off the other side of the diode. Similarly, as the beam reaches photodiode PD2, this photodiode also begins to conduct; however, this voltage is also under control of the threshold bias voltage from the variable threshold circuit to be described hereinafter. Thus, the output from photodiode PD2 is seen to be the curve labeled TP2 in FIG. 2a also. The important points of curves TP1 and TP2 are the two places where the curves cross each other. The first point, when TP1 exceeds TP2, causes the threshold voltage to be removed. The second point is when TP2 exceeds TP1. At this second point the laser beam should be exactly in between the two photodiodes and thus an accurate starting point for the subsequent counting circuit is established. Signals TP1 and TP2 are coupled to the comparator circuit C1 which compares both input signals TP1 and TP2 in accordance with its established biasing. The output from the comparator circuit C1 is a logic signal TP3 as seen in FIG. 2b. That is, at the exact crossover if the point the comparator circuit C1 operates. That is, at the beginning when the crossover point determines when the laser beam is in the middle of the left hand edge, for example, of the first photodiode, and the second edge of signal TP3 is when the crossover point of the curve TP1 and TP2 indicating that the laser beam is now directly in the center of the two photodiodes. Signal TP3 is coupled to a logic circuit 10 which detects a positive transition and thus generates signal TP4. TP4 is seen in FIG. 2c as a delay circuit at the point of which the logic circuit will generate the small pulse TP5 seen in FIG. 2d. It is TP5 that is coupled to the driver circuit D1 which is used to drive a 50 Ohm cable to subsequent circuitry to begin the data flow to the laser so as to place the information modulated light at the exact registration points on the selenium or other photoconductive surface.

Coupled to this circuit as described above is a peak detector circuit 20 which monitors the output TP1 and stores the peak voltage of the light detected by the photodiodes. As the laser fluctuates or the photoconductor ages and the laser output is either increased manually or by other automatic circuitry, the circuit shown in FIG. 1 will detect the peak signal output from the photodiodes in order to maintain the accuracy of the present circuit. However, the present circuit does not, in and of itself, modulate or change the laser light source, but only monitors the peak signal output from the detected light at the photodiodes. The output of the peak detector circuit is shown as TP12 in the figure and is coupled back to the input of operational amplifier circuit OP1 of variable threshold circuit 30. Since the peak detector circuit 20 detects the peak signal from the photodetector PD1, the variable threshold circuit 30 monitors this peak detector circuit and generates a signal at a predetermined percentage of this peak signal and feeds the signal back as signal VT to the input to the comparator circuit C1. Examples described above have included the generation of the threshold by a circuit as a proportion of the peak voltage signal at 55 percent thereof.

The operation of the circuit is as follows. Comparator CO1 compares input voltages at TP1 and TP2. Prior to the incidence of the laser beam on the photodiodes, the voltage at TP2 exceeds the voltage at TP1 by the threshold voltage Vt and the comparator output at TP3 is high. NAND gate N1 inverts TP3 and thus TP4 is low. This causes NAND gate N2 output to be high. When the incident laser beam sweeps on to photodiode PD1, the voltage at TP1 rises and when this voltage exceeds the threshold voltage present at TP2, the comparator output TP3 switches low. The signal at TP3 is inverted by NAND gate N2 and TP4 goes high with a small delay. NAND gate N2 output remains high. When the laser beam sweeps from PD1 to PD2 and the voltage at TP2 crosses over that at TP1, the comparator output at TP3 switches high. The voltage at TP4 also switches from high to low but this signal is delayed by the RC circuit formed by R10 and C7. During this delay period, the input of NAND gate N2 is true. The output TP5 is pulsed low for this delay period and then it returns high. Driver D1 converts the pulse at TP5 to a different pulse for transmission over a cable. There is no further activity in the comparator, gates, or the driver as the laser beam sweeps off the photodiodes for the next pass.

The variable threshold circuit 30 adjusts the threshold voltage at TP2 to be a fraction, say 55% of the peak voltage of TP1. The output of the peak detector circuit 20 at TP12 is one of the inputs to operational amplifier OP1 in the variable threshold circuit. The other input to the circuit is TP3 from comparator C1. During the period between pulses on TP1 the voltage at TP3 is +5 V. This causes transistor Q2 to be back biased via diode CR5 and thus turned off. This permits the threshold voltage $V_T$ to be determined by the buffered peak detector output voltage at the output of operational amplifier OP1 and the resistor divider formed by R1 and R50, R51. The dividing ratio is chosen to set the threshold voltage $V_T$ at the desired percentage of the peak voltage on TP1. The circuit remains quiescent until TP1 voltage exceeds $V_T$ and the comparator C1 output at TP3 drops to ground level. This causes the voltage at TP14 to drop and transistor Q2 turns on dropping the voltage at TP13 to ground and reducing the threshold voltage $V_T$ to ground. When the voltage at TP2 again exceeds TP1 the comparator permits TP3 to return to +5 V, transistor Q2 turns off and $V_T$ threshold voltage returns to the desired percentage of TP1 peak voltage.

Operational amplifier OP2 and OP3 are the input and storage stages of the peak detector. The detector input pulse from TP1 causes OP2 to charge capacitor C13 through isolating diode CR3. The stored voltage on C13 is the input for op amp OP3 which is used for voltage gain and buffering. The output of OP3 is divided and fed back to OP2 input for comparison with the detector input pulse from TP1. When an input pulse arrives, C13 is only charged if the input pulse peak is greater than the feedback voltage. The output of OP3 is a DC voltage proportional to the peak of the detector input voltage.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A threshold scan detector utilized in raster output scan light beam systems, comprising first and second photodetector means (PD1, PD2) in the path of the output scan beam, said first photodetector means (PD1) emitting a first electric signal and said second photodetector means (PD2) emitting a second electric signal, comparator circuit means (CO1) coupled to said first and second photodetector means for generating a third electrical signal when said first and second electrical signals crossover in value, the second of said crossovers accurately indicating when said scan beam is directly in the center of said first and second photodetector means, logic circuit means (10) coupled to said comparator circuit means (CO1) for generating a fourth electrical signal when said second crossover signal occurs, driver circuit means (40) coupled to said logic circuit means (10) for generating a drive signal representing a precise start of scan or end of scan signal, peak detector circuit means (20) for detecting and storing the peak signal voltage of the scan light beam detected by said first photodetector means, and variable threshold circuit means (30) coupled to said peak detector circuit means (20) for monitoring the value of the peak signal voltage and generating a variable threshold signal at a predetermined percentage of said peak signal voltage, said variable threshold signal being couled back to the input of said comparator circuit means for maintaining the threshold level of operation of said comparator circuit means at said predetermined percentage of said peak signal voltage.

2. The threshold scan detector as set forth in claim 1 wherein said variable threshold circuit means comprises:

operational amplifier means (OP1) for receiving the peak signal voltage from said peak detector circuit (20), diode means (CR5) coupled to the output of said operational amplifier means for providing a back bias signal when no scan beam impinges on photodetector PD1, transistor means coupled between the output of said operational amplifier means (OP1) and ground potential and responsive to said back bias signal, such that said transistor means is back biased upon receipt of said back bias signal, thus providing for the variable threshold signal to pass to said comparator curcuit means.

3. The threshold scan detector means as set forth in claim 2 further including,
resistor divider circuit means between said variable threshold circuit means and said comparator circuit means for providing the signal dividing capability for said predetermined percentage of said peak signal voltage.

* * * * *